United States Patent
Burgoyne, Jr. et al.

(10) Patent No.: US 7,179,878 B2
(45) Date of Patent: Feb. 20, 2007

(54) POLY(ARYLENE ETHER) POLYMER WITH LOW TEMPERATURE OR UV CROSSLINKING GRAFTS AND DIELECTRIC COMPRISING THE SAME

(76) Inventors: William Franklin Burgoyne, Jr., 1746 High Ridge Rd., Bethlehem, PA (US) 18015; Christine Peck Kretz, 2199 Greenmeadow Dr., Macungie, PA (US) 18062

(*) Notice: Subject to any disclaimer, the term of this patent is extended or adjusted under 35 U.S.C. 154(b) by 232 days.

(21) Appl. No.: 10/978,542

(22) Filed: Nov. 1, 2004

(65) Prior Publication Data
US 2005/0240002 A1 Oct. 27, 2005

Related U.S. Application Data

(60) Provisional application No. 60/516,565, filed on Oct. 31, 2003.

(51) Int. Cl.
*C08G 65/38* (2006.01)
*C08G 65/42* (2006.01)
*C08G 65/48* (2006.01)

(52) U.S. Cl. .................. 528/86; 528/425; 528/488; 528/491; 528/493; 528/503; 525/390; 525/534; 525/70

(58) Field of Classification Search .............. 528/86, 528/425, 488, 491, 493, 503; 525/390, 534, 525/70
See application file for complete search history.

(56) References Cited

U.S. PATENT DOCUMENTS

| | | | |
|---|---|---|---|
| 5,114,780 A | 5/1992 | Mercer et al. | |
| 5,179,188 A | 1/1993 | Mercer et al. | |
| 6,060,170 A | 5/2000 | Burgoyne | |
| 6,716,955 B2 | 4/2004 | Burgoyne | |

FOREIGN PATENT DOCUMENTS

EP          1 122 746 A1    8/2001

*Primary Examiner*—Duc Truong
(74) *Attorney, Agent, or Firm*—Anne B. Keirnan; Michael K. Boyer

(57) ABSTRACT

Poly(arylene ether) polymers are provided having polymer repeat units of the following structure:

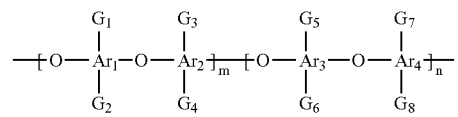

wherein $Ar_1$, $Ar_2$, $Ar_3$, and $Ar_4$ are identical or different aryl radicals, m is 0 to 1, n is 1-m, and at least one of $G_1$, $G_2$, $G_3$, $G_4$, $G_5$, $G_6$, $G_7$ and $G_8$ is a hydroxyalkyl furan group. Thin films of the polymer and methods of making the polymer are also provided.

24 Claims, 4 Drawing Sheets

POLY(ARYLENE ETHER) POLYMER WITH LOW TEMPERATURE OR UV CROSSLINKING GRAFTS AND DIELECTRIC COMPRISING THE SAME

This application claims the priority of an earlier provisional application, U.S. Ser. No. 60/516,565 having the same title and filed on Oct. 31, 2003, which is incorporated herein by reference.

BACKGROUND OF THE INVENTION

This invention relates to poly(arylene ether) polymers, and more particularly to grafting functional groups to the backbone of poly(arylene ether) polymers to provide crosslinkable polymers that crosslink at low temperatures and have particular utility as a dielectric, passivation, insulating, or, super high aperture enhancing material with high glass transition temperatures and low moisture uptake.

The electronics and display industries have sought low dielectric materials for use in fabricating fine dimension integrated circuits and less finely dimensioned thin film transistors for flat panel displays and medical imaging. However, the need for materials compatibility and dimensional stability over a wide range of conditions not only during ultimate end use, but also during further processing conditions leading to the finished integrated circuits and thin film transistors, has presented a significant problem. The problem has been to make a polymeric thermoset system that meets the mechanical property requirements of these applications, but also cure at relatively low temperatures. This problem has been a very difficult one to solve, particularly for high Tg polymers where the desired temperature for reaction (i.e., cure) is at or below 300° C. and more preferably below 250° C. It is also desirable to induce crosslinking by UV radiation so that the dielectric polymer is photoimageable.

There is also a need in the electronic, display, and medical imaging fabrication industries for the replacement of silicon-based, dielectric or insulating materials with materials of lower dielectric values. Silica and its modified versions have dielectric values on the order of 3.0 to 5.0 and usually 4.0 to 4.5. Polymeric materials used as replacements for silica as interlayer dielectric materials can have dielectric constant values in the range of 1.9 to 3.5, with values that are highly dependent on the structure of the polymeric materials. To successfully replace silicon-based dielectric and insulating materials, the properties of polymeric materials must conform to the rigid manufacturing requirements for integrated circuits or microchips in the electronic fabrication industry or for passivation or super high aperture enhancement in organic or silicon-based thin film transistors employed for flat panel displays, sensors, and medical imaging. Crosslinking has been recognized as one way to address the requirements of electronic, display, and imaging materials polymers.

Past attempts utilized various different approaches for crosslinking polymers. A detailed summary of these attempts is provided in the inventor's U.S. Pat. No. 6,060,170, assigned to Air Products & Chemicals, Inc. This patent teaches the use of poly(arylene ether) polymer compositions having aromatic groups grafted on the poly(arylene ether) backbone, which grafts allow for crosslinking of the polymers in a temperature range of 200 to 450° C.

U.S. Pat. Nos. 5,179,188 and 5,114,780 to Mercer et al. also disclose poly(arylene ether)-based polymers. These patents teach that fluorinating the backbone of such polymers provides a dielectric material with superior properties. However, the use of fluorinated arylene groups in the backbone of the polymer introduces functional reactive groups, which in turn deteriorate insulating and moisture adsorption properties.

Integrated circuit, chip, display, and imaging manufacturing require suitable coatings. These coatings are required to have low dielectric constants. In addition, it is desirable to provide these coatings with unlimited storage stability at 25° C., storage stability at 40° C. sufficient to weather transportation in non-refrigerated vehicles, and cure temperatures of 200 to 300° C. within 1 to 2 hours. After cure, it is desired to have a Tg in the range of 200 to 300° C., a dielectric constant below 3.5 with frequency independence, and a maximum moisture absorption of less than 1 wt %.

All references cited herein are incorporated herein by reference in their entireties.

BRIEF SUMMARY OF THE INVENTION

Accordingly, the invention provides poly(arylene ether) polymers comprising the polymer repeateing units of the following structure:

wherein $Ar_1$, $Ar_2$, $Ar_3$, and $Ar_4$ are identical or different aryl radicals, m is 0 to 1, n is 1-m, and at least one of $G_1$, $G_2$, $G_3$, $G_4$, $G_5$, $G_6$, $G_7$ and $G_8$ is a hydroxyalkylfuran group. Further provided are poly(arylene ether) polymers of the above structure wherein at least one $G_1$, $G_2$, $G_3$, $G_4$, $G_5$, $G_6$, $G_7$, and $G_8$ is selected from the group consisting of where:
X = alkoxy, aryl, or alkyl.

The invention further provides poly(arylene ether) polymer compositions comprising polymer repeat unit selected from the group consisting of:

-continued

The polymer may be a poly(arylene ether) polymer including polymer repeat units adapted to crosslink at a curing temperature at or below 300° C. without producing volatiles during curing and without providing functional groups after curing.

Also provided is a composition containing the polymer, and optionally, a diluent, which does not afford a functional group or interfere with the mechanical or electrical properties of the composition.

Further provided is a composition containing the polymer, and optionally, a catalyst, which does not afford a functional group, but does afford crosslinking of the polymer upon UV or thermal treatment.

Further provided are films of these polymers, with the options of diluent and/or catalyst, which may be used (cured or uncured) for dielectric layers in organic or silicon-based thin film transistors for flat panel displays, sensors, medical imaging or MEMS device manufacture, III–V semiconductor manufacture, or silicon or polymer-based integrated circuit manufacture.

Further provided are these polymers, films of these polymers, and films of these polymers containing optional diluent and/or catalyst, which may be used as passivation or super high aperture enhancement layers in organic or silicon-based thin film transistors for flat panel displays, medical imaging, or sensors.

Further provided is a method for providing a substrate with a film having a Tg from 250–350° C., a dielectric constant below 3.5 with frequency independence, and a maximum moisture absorption of less than 1 wt %, the method comprising applying the polymer of the invention to the substrate and heating the polymer to a curing temperature at or below 300° C.

Still further provided are polymers that are cured via UV irradiation in the presence of a photoacid generator or cured thermally with or without the presence of a mineral or organic acid.

DETAILED DESCRIPTION OF THE INVENTION

Poly(arylene ether) polymers have been disclosed in U.S. Pat. No. 6,716,955 assigned to the same assignee and incorporated herein by reference in its entirety.

The aforementioned drawbacks of the prior art are overcome by grafting onto poly(arylene ether) polymers unsaturated groups (i.e., grafts (G)), which can crosslink at a curing temperature of less than or equal to 300° C. The invention thus relates to specific poly(arylene ether) polymers and compositions containing them, their use in one or more of the following functions as dielectrics, passivation layer, insulating layer, super high aperture enhancement agents, photoimageable or thermally cured coatings for applications that include, but are not limited to, organic or silicon-based thin film transistors, integrated circuits, memory devices, sensors, microelectromechnical system (MEMS) devices, and III–V semiconductors. This invention also includes a microelectronic device or a thin film transistor comprising the photoimageable or thermally cured coatings of the polymer of the invention, and a method of crosslinking the polymers. Curing can be accomplished by heating, by UV curing, or some combination of these two crosslinking methods.

Polymers of the invention comprise polymer repeat units represented by the following structure:

where $Ar_1$, $Ar_2$, $Ar_3$, and $Ar_4$ are identical or different aryl radicals, m is 0 to 1, n is 1-m, and at least one of the aryl radicals is grafted to at least one group (G), which is not aromatic and is adapted to crosslink at a curing temperature equal to or less than 300° C. without producing volatiles during curing and without providing functional groups after curing. In certain embodiments, each of the aryl radicals of the polymer repeat units is grafted to two unsaturated groups G, as shown in the following structure:

where $G_1$, $G_2$, $G_3$, $G_4$, $G_5$, $G_6$, $G_7$ and $G_8$ are identical or different hydroxyalkylfuran groups. In other embodiments at least one of $G_1$, $G_2$, $G_3$, $G_4$, $G_5$, $G_6$, $G_7$ and $G_8$ is a hysroxyalkylfuran group.

Polymers of the invention do not necessarily consist only of these polymer repeat units (i.e., G-containing polymer repeat units). In addition to embodiments wherein the polymer is built solely from the G-containing polymer repeat units, the invention also encompasses polymers comprising other polymer repeat units in addition to the G-containing polymer repeat units, such as, e.g., poly(arylene ether) polymer repeat units lacking any furan grafts (i.e., G-free polymer repeat units). The sequence in which different polymer repeat units can be combined to form the polymer of the invention is not particularly limited. Thus, polymers of the invention can be, e.g., random, alternating, or block copolymers of the different polymer repeat units.

The average number of unsaturated groups G per polymer repeat unit is preferably 0.01 to 8.0, more preferably 0.1 to 4.0, even more preferably 0.25 to 1. This average is calculated as the total number of unsaturated groups G per polymer divided by the total number of repeat units per polymer.

Preferably, the unsaturated groups G are independently selected from the group consisting of furan derivatives. In certain embodiments, the groups G are derived from addition of furfural derivatives to the poly(arylene ether).

where:
X = alkoxy, aryl, or alkyl

Preferably, the aryl radicals $Ar_1$, $Ar_2$, $Ar_3$, and $Ar_4$ are independently selected from the group consisting of:

More preferably at least one of aryl radicals $Ar_1$, $Ar_2$, $Ar_3$ and $Ar_4$ is (and still more preferably, each of $Ar_1$ and $Ar_3$ is independently) 9,9-bis-(4-hydroxyphenyl)-fluorene, 2,2-diphenylhexafluoropropane or 2,2-diphenylpropane.

Preferred examples of aryl radicals having furan group(s) grafted thereto include:

-continued

The invention encompasses the foregoing polymers in cured (crosslinked) condition and uncured condition. Polymers of the invention can be thermally cured by heating to a temperature of at least about 125° C., preferably from 200° C. to 300° C. Optionally, crosslinking is induced in the presence of a catalyst selected from the group consisting of a mineral acid, an organic acid, UV radiation, a photoacid generator (PAG) and/or mixtures thereof.

Thin films of the invention may be deposited via any method including spin-coating, dip-coating, and spraying, on silicon, □-silicon, low temperature polysilicon (LTPS), silicon oxide, silicon-based glass, indium tin oxide, steel foil, thermoset or thermoplastic polymers, gate insulators, and gate metals.

The invention will be illustrated in more detail with reference to the following examples, but it should be understood that the present invention is not deemed to be limited thereto.

EXAMPLE 1

Preparation of Poly(Arylene Ether) Polymer, PAE-2

A mixture of 35.04 g (0.1000 mol) of 9,9-bis(4-hydroxyphenyl)fluorene, 75 g of toluene, and 100 g of benzophenone was charged to a 500 mL, 3-necked, round-bottomed flask fitted with a Dean-Stark trap, condenser, nitrogen inlet, mechanical stirrer, and thermometer. The mixture was heated to 60° C. with stirring under a nitrogen atmosphere. After homogeneity had been reached, 16 g of a 50.00 wt % aqueous solution of sodium hydroxide (0.2000 mol of sodium hydroxide) were slowly added over 10 min. The reaction mixture was heated to about 140° C. and the water azeotrope was collected. After 4 hours and complete dehydration, the temperature of the reaction mixture was increased to 200° C. and the toluene was removed via distillation. The reaction mixture was cooled to 80° C. and 31.20 g (0.1000 mol) of 4,4'-dibromobiphenyl were added. The reaction mixture was then heated to 200° C. A 10 mL portion of a copper (I) chloride/quinoline solution (containing 0.10 g of copper (I) chloride, 1.00 mmol) was added and the reaction mixture was maintained at 200° C. for 48 hours. The reaction mixture was cooled to 100° C., and 200 g of toluene were added. The reaction mixture was then quenched in a rapidly stirred solution of 25 g of acetic acid in 1000 g of methanol. The precipitate was isolated and placed in 2L of boiling water for 8 hours. The precipitate was first dried in an oven (100° C.) then dissolved in 300 g of tetrahydrofuran. The polymer solution was filtered and then precipitated in 1L of methanol. The precipitate was collected, washed with methanol, and then dried in a vacuum oven at 100° C. overnight. This procedure afforded 42 g of polymer which possessed the following properties: Molecular weight (by GPC): Mw=65,300; Mn=20,700; d=3.16; Tg (by DSC): 257° C.; Thermal stability (by TGA, isothermal weight loss at 400° C.): <0.1 wt % loss/hr.

The polymer repeat unit of the resulting polymer is represented by the following structure:

EXAMPLE 2

Grafting Furfural to PAE-2 (Prepared in Example 1)

In a 1 L, three-necked, round-bottomed flask, 22.22 g of PAE-2 (0.0404 mol of polymer repeat unit) was dissolved in 600 mL of dry THF with mechanical stirring and under a nitrogen blanket. The solution was then cooled to −40° C. with the aid of a dry ice/acetone (or methanol) bath. With mechanical stirring, 25 mL of tert-butyllithium (1.7 M in pentane, 0.0425 mol) was added to the polymer solution over 10–15 min. After addition, the cooling bath was removed and the solution was allowed to gradually warm to −10° C. with continued stirring. A 25.0 g portion of furfural (0.260 mol) was then added slowly over 5–10 min. with mechanical stirring. The mixture was then allowed to warm to room temperature with continued stirring.

After the reaction was stirred for a minimum of 17 hr., a 10.00 g portion of glacial acetic acid (0.167 mol) was then added to the reaction mixture with continued mechanical stirring. After 3 hr., the reaction mixture was filtered through Whatman #1 filter paper, and then the polymer was precipitated by pouring the filtered reaction solution into 2 L of methanol contained in a blender. The precipitated polymer was isolated via vacuum filtration and dried in a vacuum oven (80° C. overnight). The weight of the dried polymer was determined to be 18.28 g and the graft level of isolated polymer=0.33 (33% of the polymer repeat units bearing the furfural graft as determined by $^{13}C$ NMR).

The polymer of Example 2 has the following structure:

EXAMPLE 3

Thermal Cure of the Polymer of Example 2

A 2.5 g portion of the polymer from example 2 was dissolved in cyclohexanone to make a 10 wt % solution. The solution was poured into a frame on top of a piece of glass. The solution was allowed to dry slowly over the course of two days, which resulted in the formation of a non-brittle film of the polymer. After the film was dried, the polymer film was removed from the glass, and placed in a vacuum oven where it was dried at 125° C. for 17 hours in order to remove the bulk of the residual cyclohexanone solvent from the film. The film thickness was ~65μ (ca. 2.5 mil.) and a portion of the film was cut into several strips of ~0.5 cm×5.0 cm dimension for thermal cure and dynamic mechanical analysis (DMA).

Thermal Treatment of Film Strips

Film number 1 was analyzed as is after a 125° C. soft bake.

Film number 2 was thermally treated at 250° C. in nitrogen atmosphere.

Film number 3 was thermally treated at 300° C. in nitrogen atmosphere.

Figure 1:
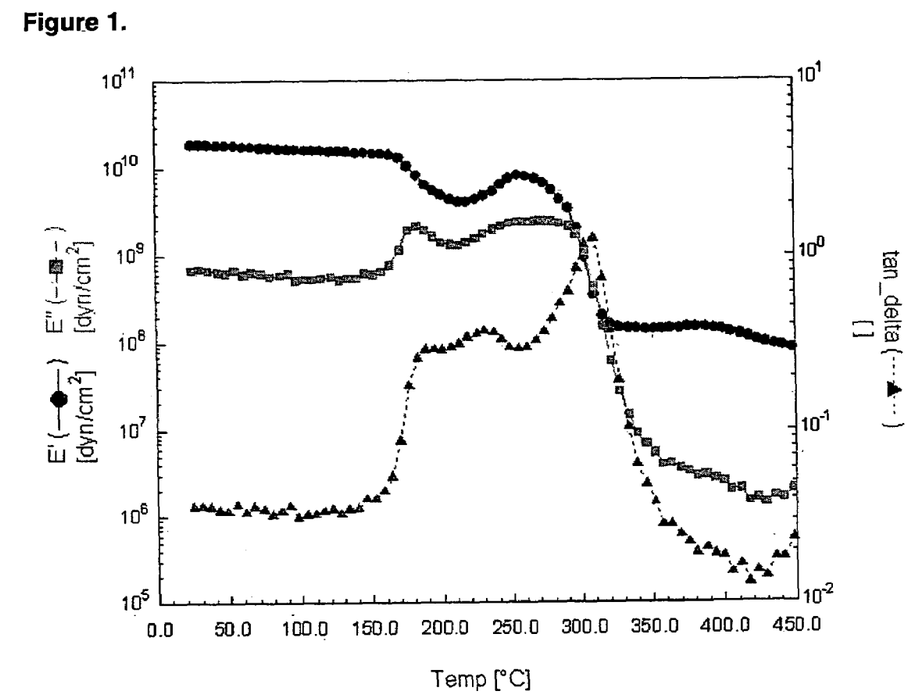
FIG. 1 is a DMA Analysis of Film 1 described in the Examples (soft baked to 125° C. under vacuum).
Figure 2:
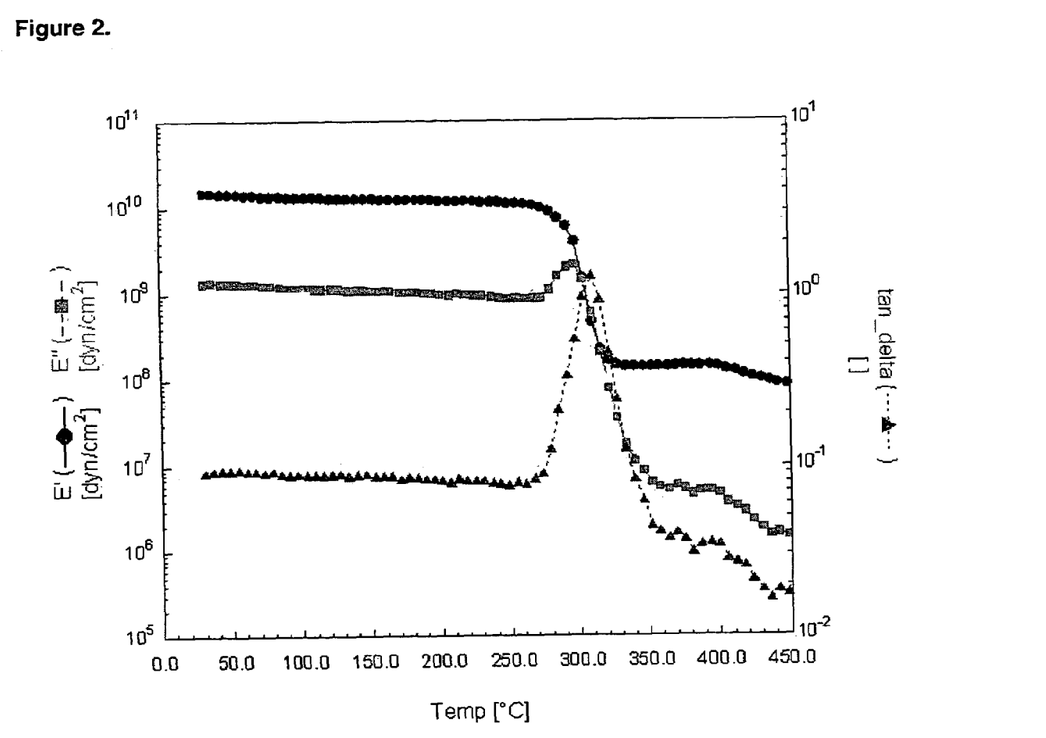
FIG. 2 is DMA Analysis of Film 2 described in the Examples (soft baked to 125° C. under vacuum then cured at 250° C. in N₂)
Figure 3:
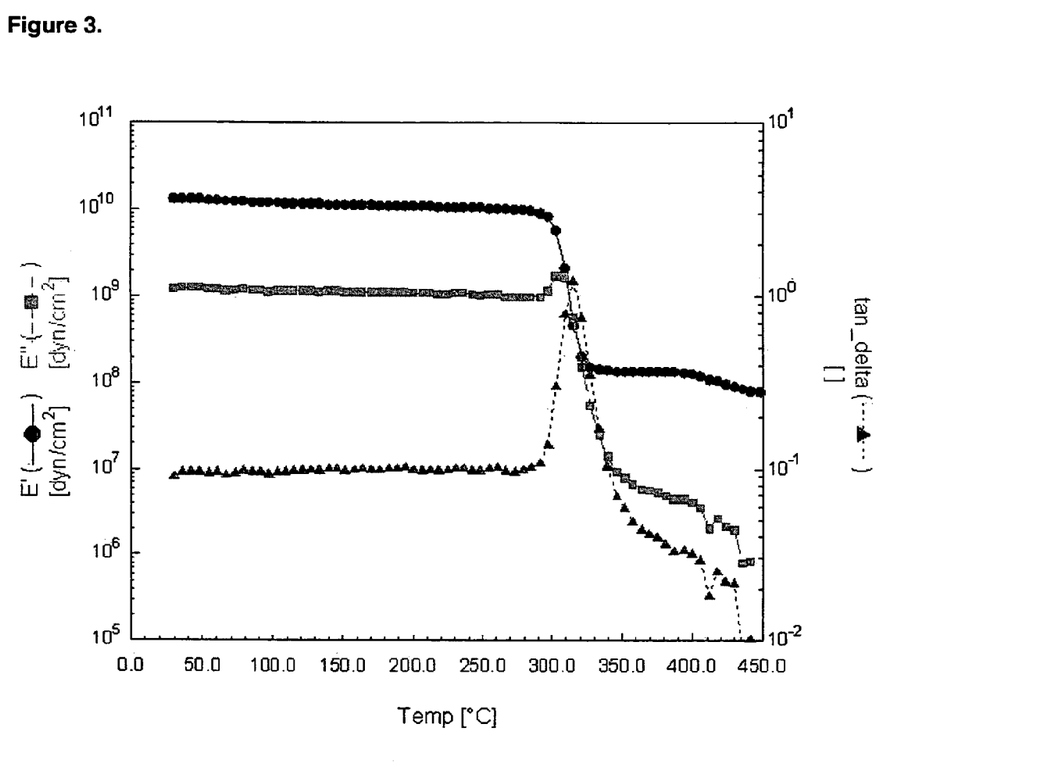
FIG. 3 is DMA Analysis of Film 3 described in the Examples (soft baked to 125° C. under vacuum then cured at 300° C. in N₂).
Figure 4:
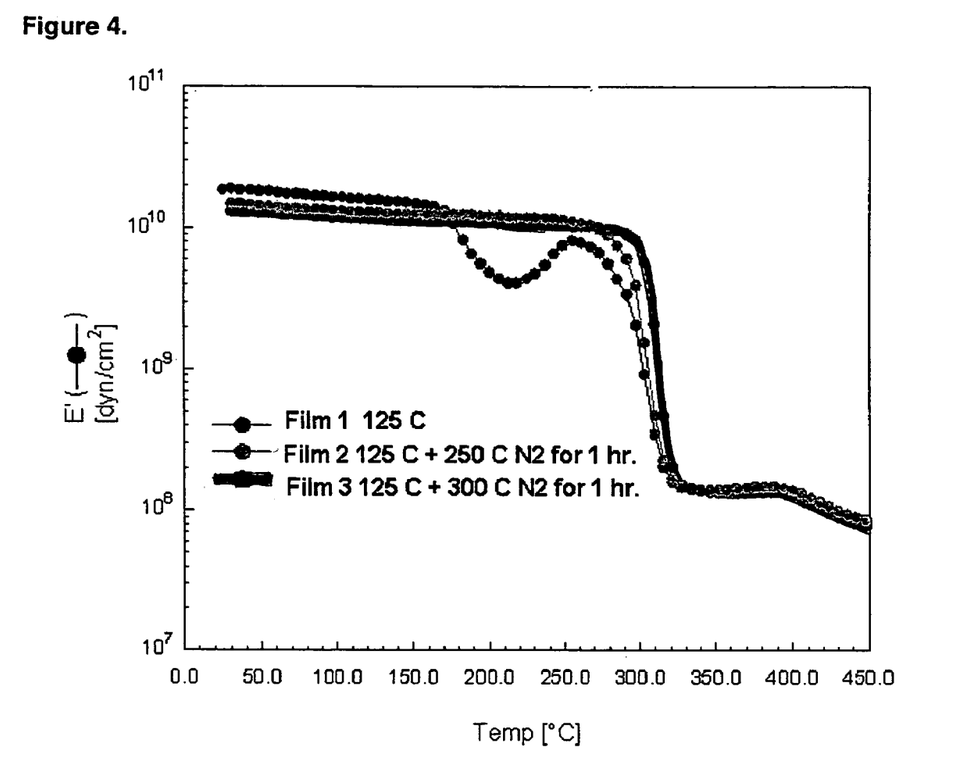
FIG. 4 is Modulus Comparison Amoung Films 1, 2, and 3 described in the Examples.

Each film was analyzed by DMA and the results are shown in FIGS. 1–4. The results are shown for films cured at 125° C. for 17 hours (FIG. 1), and at 125° C. for 17 hours followed by one hour at 250° C. (FIG. 2), and at 125° C. for 17 hours followed by one hour at 300° C. (FIG. 3). FIG. 1 shows solvent evaporation and drying in the DMA instrument prior to the actual Tg, which is to be expected since the sample was only soft baked at 125° C. It is thus difficult to determine a Tg value for this grafted poly(arylene) ether. This sample becomes crosslinked upon heating the film above 125° C., with a plateau modulus of approximately 1.5 e8 dyn/cm2. The additional heat treatments shown in FIGS. 2 and 3 affect the Tg, but not the modulus. Tg (via tan delta) after one hour at 250° C. was 292±2° C.; after one hour at 300° C., it was 303±2° C. FIG. 4 shows a comparison of the modulus data for these three films cured at different temperatures.

EXAMPLES 4–7

Spinning, Curing, and Film Properties of the Polymer of Example 2

A 13 wt % solution of the polymer of example 2 was prepared by mixing 25 g of polymer with 167 g of cyclohexanone. For examples 4 and 5, 0.375 g of a photoacid generator (PAG1) was added to 96 g of 13 wt % polymer solution and for examples 6 and 7, 0.375 g of a photoacid generator (PAG2) was added to 96 g of 13 wt % polymer solution. These solutions were passed through 10μ and 0.2μ filters prior to spin coating. Thin films of the polymer of interest were deposited on silicon wafers via spin coating under the conditions specified in Table 1. A typical curing cycle involved curing the dry film on silicon at 100° C. for 1 min., then conducting optional UV curing using a simple mask at the intensity and time frames specified in Table 1, and then measuring the thickness of the film. The films were developed and rinsed with cyclohexanone, and the dielectric values were recorded after conducting a final heat treatment at 300° C. for times specified in Table 1. The curing conditions for the films of examples 4–7 as well as the resulting film thicknesses and dielectric values after curing are also included in Table 1 above. In the case where no UV curing was conducted, the thermal treatment of 10 minutes at 300° C. immediately followed the thermal treatment of 1 minute at 100° C. In examples 4 and 5, PAG1 used was 2-(4-Methoxystyryl)-4,6-bis(trichloromethyl)-1,3,5-triazine (max. absorbance, λ=379 nm), the UV source was I-line (λ=365 nm), and the dose of ultraviolet light is given in units of time and of mW/cm². In examples 6 and 7, PAG2 is triphenylsulfonium triflate (max. absorbance, λ=233 nm) and the UV source was a broad band lamp with its strongest radiance in the 210–320 nm range, and the dose units are watts and time. Other acids that may be used are organic acids, mineral acids, or other photoacid generators.

This data serves to show a portion of the range of thicknesses that may be achieved for applications such as a dielectric for silicon and polymeric-based integrated circuits, a passivation layer or a super high aperture enhancement agent for rigid or flexible thin film transistors for use in flat panel displays, sensors, and/or medical imaging, depending upon the solution solids and viscosity. Values are not meant to be limiting but are included as typical examples of film thicknesses that may be useful for the applications described herein. Other thicknesses may be achieved by adjusting viscosity and/or spin speeds.

TABLE 1

Thin Film Data for Dielectric, Passivation, and SHA Applications-

| Example # | Spinning Conditions | Thermal Curing Conditions | UV Curing Conditions | Film Thickness (microns) | Dielectric Constant |
|---|---|---|---|---|---|
| 4 | 1 min./1000 rpm | 1 min./100 C. 1 min./300 C. | 10 min.//25.50 mW/c m2 | 1.73 | 2.83 |
| 5 | " | 1 min./100 C. 10 min./300 C. | None | 1.69 | 3.14 |
| 6 | " | 1 min./100 C. 1 min./200 C. | 1 min./119 watts (231–270 nm) | 3.28 | 3.03 |
| 7 | " | 1 min./100 C. | 3 min./119 watts (231–270 nm) | 3.33 | 2.95 |

What is claimed is:

1. Poly(arylene ether) polymers comprising polymer repeat units of the following structure:

wherein $Ar_1$, $Ar_2$, $Ar_3$, and $Ar_4$ are identical or different aryl radicals, m is 0 to 1, n is 1-m, and at least one of $G_1$, $G_2$, $G_3$, $G_4$, $G_5$, $G_6$, $G_7$ and $G_8$ is a hydroxyalkyl furan group.

2. The polymers of claim 1, wherein at least one of $G_1$, $G_2$, $G_3$, $G_4$, $G_5$, $G_6$, $G_7$, and $G_8$ is selected from the group consisting of:

where:
X = alkoxy, aryl, or alkyl.

3. The polymers of claim 1 wherein $Ar_1$, $Ar_2$, $Ar_3$, and $Ar_4$ are independently selected from the group consisting of:

4. The polymers of claim 1 wherein at least one of the polymer repeat units is selected from the group consisting of:

5. The polymers of claim 1 wherein at least one of the polymer repeat units is:

6. The polymers of claim 1, which are cured via UV radiation.

7. The polymers of claim 1, which are cured via UV irradiation in the presence of a photoacid generator.

8. The polymers of claim 1, in a dielectric layer.

9. The polymers of claim 1 in cured form, said cured form of the polymers having a Tg from 160 to 180° C., a dielectric constant below 2.7 with frequency independence, and a maximum moisture absorption of less than 0.17 wt %.

10. The polymers of claim 1 which are thermally cured.

11. The polymers of claim 1, and diluent, which does not afford a functional group or interfere with the mechanical or electrical properties of the composition.

12. The polymer of claim 1 and a catalyst.

13. The polymer of claim 1, wherein the average number of said G groups per polymer repeat unit is 0.01 to 8.

14. Thin films comprising the poly(arylene ether) polymers comprising polymer repeat units of the following structure:

wherein $Ar_1$, $Ar_2$, $Ar_3$, and $Ar_4$ are identical or different aryl radicals, m is 0 to 1, n is 1-m, and at least one of $G_1$, $G_2$, $G_3$, $G_4$, $G_5$, $G_6$, $G_7$ and $G_8$ is a hydroxyalkylfuran group.

15. Thin films of the polymers of claim 14, in dielectric layers.

16. Thin films of claim 14 having a Tg from 250–350° C., a dielectric constant below 3.5 with frequency independence, and a maximum moisture absorption of less than 1 wt %.

17. Thin films of claim 14, which are cured via UV irradiation in the presence of a photoacid generator.

18. Thin films of claim 14 which are cured thermally.

19. The thin films of claim 18 wherein the film has a Tg from 250° C. to 350° C., a dielectric constant below 3.5 with frequency independence, and a maximum moisture absorption of less than 1 wt %, wherein said thin film is formed by a method comprising applying the polymer of claim 1 to the substrate and heating the polymer to a curing temperature.

20. The thin films of claim 19, wherein the curing temperature is at or below 300° C.

21. The thin films of claim 19, wherein the heating of the polymer is conducted in the presence of a photoacid generator.

22. The thin films of claim 19, wherein the polymer is applied to the substrate in a composition further comprising a diluent that does not afford a functional group or interfere with mechanical or electrical properties of the composition.

23. The thin films of claim 19, wherein the film is an interlayer dielectric that insulates the substrate from a second substrate.

24. The thin films of claim 19, wherein the heating of the polymer is initiated with UV radiation.

* * * * *